(12) United States Patent
Song

(10) Patent No.: US 8,000,872 B2
(45) Date of Patent: Aug. 16, 2011

(54) VEHICLE ANTI-SKID BRAKE CONTROL SYSTEM AND ITS CONTROL METHOD

(75) Inventor: Youchuan Song, Guangdong (CN)

(73) Assignee: BYD Company Limited, Shenzhen, Guangdong (CN)

( * ) Notice: Subject to any disclaimer, the term of this patent is extended or adjusted under 35 U.S.C. 154(b) by 771 days.

(21) Appl. No.: 11/814,785

(22) PCT Filed: Jan. 25, 2006

(86) PCT No.: PCT/CN2006/000136
§ 371 (c)(1),
(2), (4) Date: May 6, 2008

(87) PCT Pub. No.: WO2006/081753
PCT Pub. Date: Aug. 10, 2006

(65) Prior Publication Data
US 2008/0319611 A1    Dec. 25, 2008

(30) Foreign Application Priority Data
Feb. 4, 2005    (CN) .......................... 2005 1 0005292

(51) Int. Cl.
*B60T 8/172*    (2006.01)
*B60T 8/1761*    (2006.01)
(52) U.S. Cl. ....................................................... 701/71

(58) Field of Classification Search .................... 701/70, 701/71, 74; 303/139, 140
See application file for complete search history.

(56) References Cited

U.S. PATENT DOCUMENTS

| | | | |
|---|---|---|---|
| 5,328,256 A | 7/1994 | Ohta et al. | |
| 6,109,704 A | 8/2000 | Batistic | |
| 6,351,702 B1* | 2/2002 | Tange et al. | ................. 701/96 |
| 6,505,108 B2* | 1/2003 | Bodie et al. | ................. 701/41 |
| 6,588,859 B2* | 7/2003 | Loudon et al. | ............... 303/146 |
| 6,681,180 B2 | 1/2004 | Bevly et al. | |
| 7,392,120 B2* | 6/2008 | Matsumoto et al. | ........... 701/41 |

FOREIGN PATENT DOCUMENTS
DE        19640588        4/1997
* cited by examiner

*Primary Examiner* — Kevin Hurley
(74) *Attorney, Agent, or Firm* — Volpe and Koenig, P.C.

(57) ABSTRACT

An anti-skid brake control system and its control method for vehicle has a signal collection unit and an electronic control unit. The electronic control unit includes a data receiving module, a data processing module and a data control module. The data receiving module receives the data collected by the signal collection unit. The data processing module calculates sideslip angles and slip rates for wheels. The data control module sets target slip rates based on the slip rates corresponding to the friction coefficient $\mu$ for different sideslip angles. The device emits control commands after comparing the calculated slip rate to the set target slip rate, so that the ABS control is real time.

17 Claims, 6 Drawing Sheets

VEHICLE ANTI-SKID BRAKE CONTROL SYSTEM AND ITS CONTROL METHOD

FIELD OF INVENTION

The present invention relates to a vehicle anti-skid brake (ABS) control system and its control method, which belongs to the field of control of vehicle ABS.

BACKGROUND

In existing vehicle control systems, by means of obtaining some parameters (e.g., sideslip angle or slip rate of the vehicle etc.) at the instantaneous time while the vehicle runs can control the vehicle more effectively. On automobiles in early stage, the running parameters were measured by means of onboard sensors; as GPS technology is widely used, the technique of utilizing GPS technology to calibrate the sensors and thereby obtaining vehicle running parameters has been proposed extensively.

U.S. Pat. No. 6,681,180 provided a method for judging whether the vehicle wheels slip by GPS on the basis of a two-wheel vehicle model; with the method, the sideslip angle of the vehicle can be obtained dynamically. Said method employs an apparatus comprising a signal collection unit and an electronic control unit; said signal collection unit comprises a GPS configured to obtain speed and position signals of the vehicle, a gyro configured to obtain angular speed signal of the vehicle, and an acceleration sensor configured to obtain acceleration signal of the vehicle; said electronic control unit comprises a data receiving module configured to obtain the data of the signal collection unit and a data processing module configured to calculate sideslip angles for the wheels of the vehicle. The data receiving module of said electronic control unit obtains speed and position signals of the vehicle from the GPS, the angular speed signal from the gyro, and the acceleration signal from the accelerometer, and the data processing module calculates the centroidal speed, the speeds of front and rear wheels in direction x and y, and the sideslip angles of front and rear wheels. With above apparatus and method, the instantaneous sideslip angle can be measured while the vehicle runs. Though the apparatus and method can partially reduce the occurrence of wheel lockup during braking while the vehicle turns, on one hand, the wheels often can't take full advantage of ground braking force and therefore the braking length is increased while the vehicle turns, on the other hand, wheel lockup still occurs often.

SUMMARY

The object of the present invention is to overcome the drawback that the wheels can't take full advantage of ground braking force and are often locked up completely during braking while the vehicle turns in the prior art. The present invention provides a vehicle anti-skid brake (ABS) control system and its control method that enables the wheels to take full advantage of ground braking force and prevent complete wheel lockup during braking while the vehicle turns.

The inventor of the present invention found that: though the sideslip angles for wheels can be calculated and thereby the slip rate can be obtained by using the method provided in U.S. Pat. No. 6,681,180, the patent didn't disclose how to utilize sideslip angle for ABS control for the vehicle. In existing vehicle ABS control systems and control methods, a constant slip rate threshold is set first, and when the vehicle brakes during turning, the sideslip angle is measured in real time so that the slip rate is calculated. Commands are given to the braking device in accordance with the relationship between the slip rate and the slip rate threshold. However, actually, there is close relationship between the slip rate threshold and the sideslip angle. A constant slip rate threshold often results in that it is unable to provide enough braking force while the vehicle brakes during turning, and such control system may result in wheel lockup.

In the prior art, the ABS control is to estimate parameters on the basis of a two-wheel vehicle model. Furthermore, the method provided in U.S. Pat. No. 6,681,180 is also based on the two-wheel vehicle model, i.e. the same control method is applied to left and right wheels. However, when the vehicle turns, the sideslip angles of the wheels are different, i.e. even left and right wheels in front or in rear may have different sideslip angles. Therefore, such method may cause wheel lockup when the vehicle brakes during turning.

In view that the prior art doesn't take into account the problem that different wheel sideslip angles require different slip rate thresholds in vehicle ABS control. The present invention provides an vehicle ABS control system and method, which can set the slip rate threshold depending on the sideslip angle in real time, and implement vehicle ABS control by comparing the variable slip rate threshold with the measured slip rate, so as to solve the wheel lockup problem in existing ABS control systems. Another object of the present invention is to provide a method for calculating the sideslip angles and slip rates for each wheel on four-wheel vehicle respectively on the basis of a four-wheel vehicle model, in view that the two-wheel vehicle model adopted in the prior art can't prevent wheel from locking up when the vehicle brakes during turning.

The system provided in the present invention comprises a signal collection unit and an electronic control unit, said electronic control unit comprises a data receiving module, a data processing module, and a data control module, said data receiving module is configured to obtain the data from the signal collection unit, wherein said data processing module is configured to calculate sideslip angles and slip rates for wheels, said data control module sets a slip rate threshold in accordance with the slip rate corresponding to the respective peak of braking force coefficient μ at different sideslip angles, and outputs a control command in accordance with the result of comparison between the calculated slip rate and the set slip rate threshold to perform ABS control in real time.

The method provided in the present invention comprises:

step 1: a data collection unit collecting vehicle data;

step 2: an electronic control unit receiving the vehicle data collected by the data collection unit, and calculating sideslip angles and slip rates for the vehicle wheels from said data;

step 3: the electronic control unit setting the slip rate threshold for respective sideslip angle in accordance with the slip rate corresponding to the respective peak of braking force coefficient μ at different sideslip angles; and step 4: the electronic control unit comparing the calculated slip rate with the set slip rate threshold, and outputting an ABS control command in accordance with the result of comparison.

With the system and method provided in the present invention, separate ABS control can be applied to each wheel of the vehicle. In the prior art, a constant slip rate threshold is used for vehicle ABS control; however, since the braking force coefficient μ and the corresponding slip rate vary with the sideslip angle, such an ABS control method can't apply braking force as required, and may cause the wheels unable to take full advantage of ground braking force. Therefore, the present invention sets the slip rate threshold in accordance with the relationship between slip rate corresponding to different sideslip angles and peak of braking force coefficient, so as to apply braking force as required and ensure the wheels can take full advantage of ground braking force. Furthermore, in the prior art, the vehicle ABS control system is based on a two-wheel vehicle system model, i.e., equal braking force is applied to left and right wheels. However, when the vehicle turns, each wheel may have a sideslip angle, i.e. the sideslip angles of left wheel and right wheel may be different; if equal braking force is applied to left and right wheels, the braking force may be inappropriate and thereby may cause wheel lockup. In view of that problem, the present invention establishes a four-wheel vehicle model and applies ABS control separately for each wheel in accordance with the sideslip angle and slip rate for each wheel, so that each wheel can take full advantage of ground braking force. With the system and method provided in the present invention, the ABS control system can prevent lockup of any wheel while the vehicle brakes during turning, and minimize the braking length and improve vehicle safety while preventing the vehicle from off-tracking. The ABS control method is also effectively even the vehicle runs straightly.

DETAILED DESCRIPTION OF THE PREFERRED EMBODIMENTS

Hereunder the present invention will be further detailed with reference to the accompanying drawings.

Figure 1:
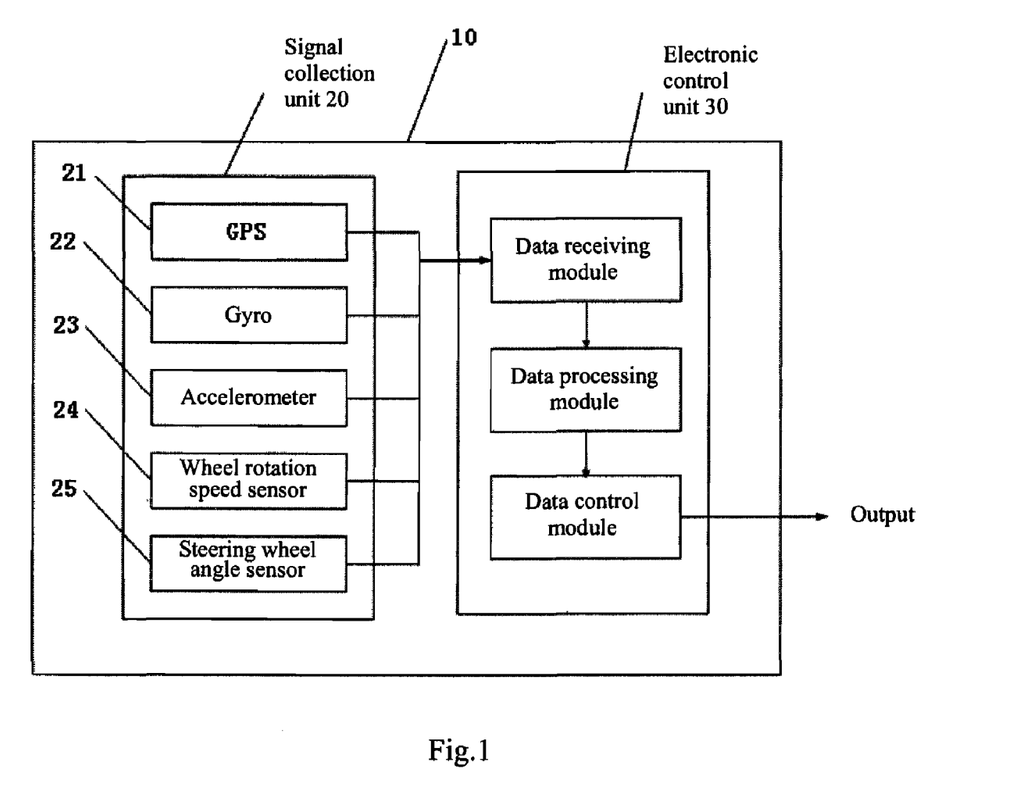
FIG. 1 is a structural block diagram of the vehicle ABS control system in accordance with the present invention.

The present invention provides an vehicle ABS control system 10, comprising a signal collection unit 20, an electronic control unit 30, as shown in FIG. 1; said signal collection unit can be implemented with the exiting technology of signal processing unit in the prior art, and it comprises: a GPS 21 configured to obtain centroidal speed of the vehicle, a gyro 22 configured to obtain angular speed, an accelerometer 23 configured to obtain acceleration, wheel speed sensors 24 configured to obtain wheel rotation speeds, and a steering wheel angle sensor 25 configured to obtain steering wheel angle. Said electronic control unit 30 comprises a data receiving module configured to obtain the data from the signal collection unit for the electronic control unit, a data processing module configured to calculate wheel sideslip angles and slip rates, and a data control module configured to perform control. Said data control module sets a slip rate threshold in accordance with the slip rate corresponding to the respective peak of braking force coefficient μ at different sideslip angles, and outputs a control command in accordance with the result of comparison between the calculated slip rate and the slip rate threshold to perform ABS control in real time.

Figure 2:
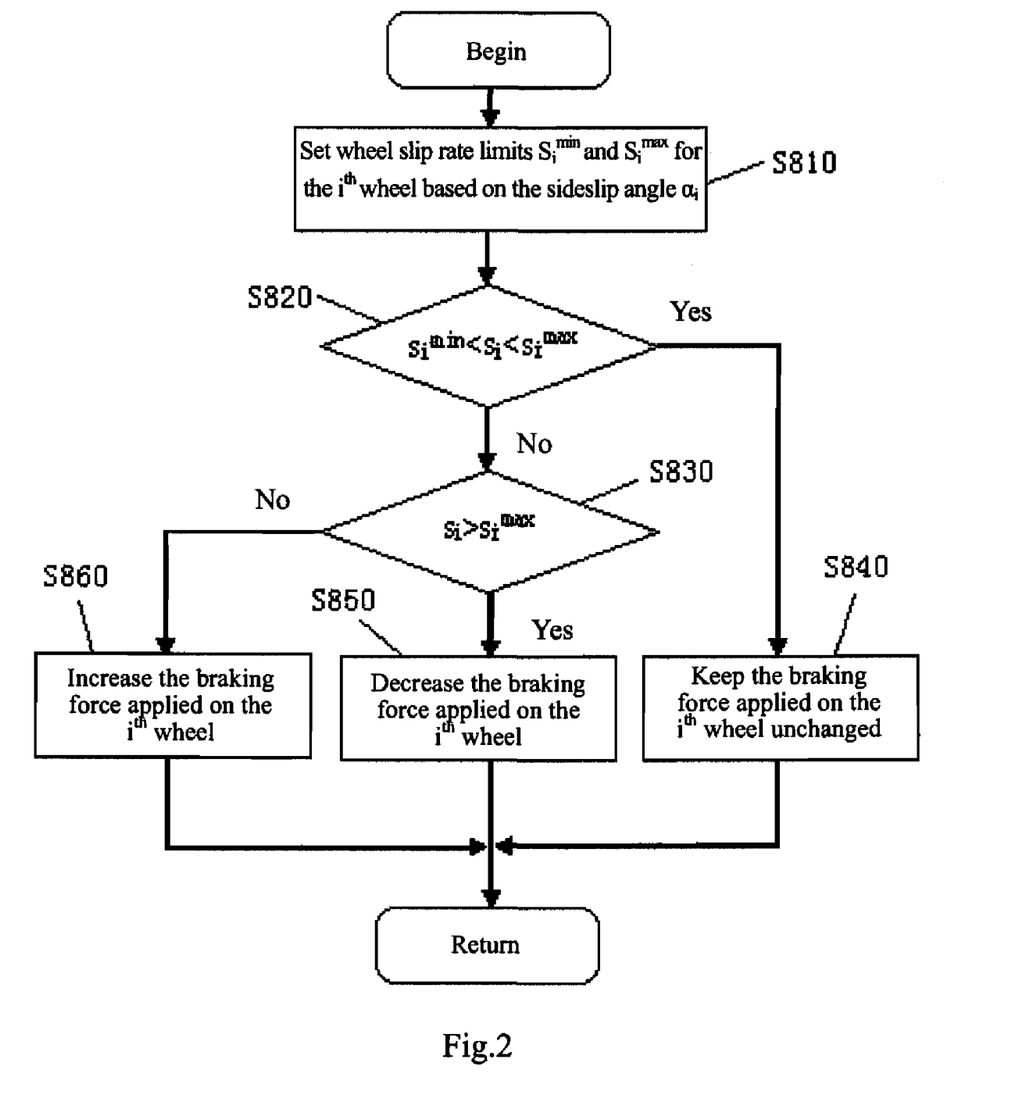
FIG. 2 is a flow diagram of the control subprogram of the data control module in the electronic control unit.

FIG. 2 is a flow diagram of the data control module. As shown in FIG. 2, the data control module of said electronic control unit 30 executes the four parallel control submodules corresponding to the four wheels in step S800. On the basis of the sideslip angle $\alpha_i$ of the $i^{th}$ wheel (i=1, 2, 3, or 4), the electronic control unit 30 sets the lower limit $s_i^{min}$ and upper limit $s_i^{max}$ of the slip rate threshold for the $i^{th}$ wheel in real time. When the vehicle brakes, if the electronic control unit 30 determines the slip rate $s_i$ for the $i^{th}$ wheel is greater than the limit $s_i^{max}$, it will output an command to decrease the braking force applied on the $i^{th}$ wheel; if $s_i$ is smaller than the limit $s_i^{min}$, it will output an command to increase the braking force applied on the $i^{th}$ wheel; and if $s_i$ is between $s_i^{min}$ and $s_i^{max}$, it will require to keep the braking force unchanged.

Figure 3:
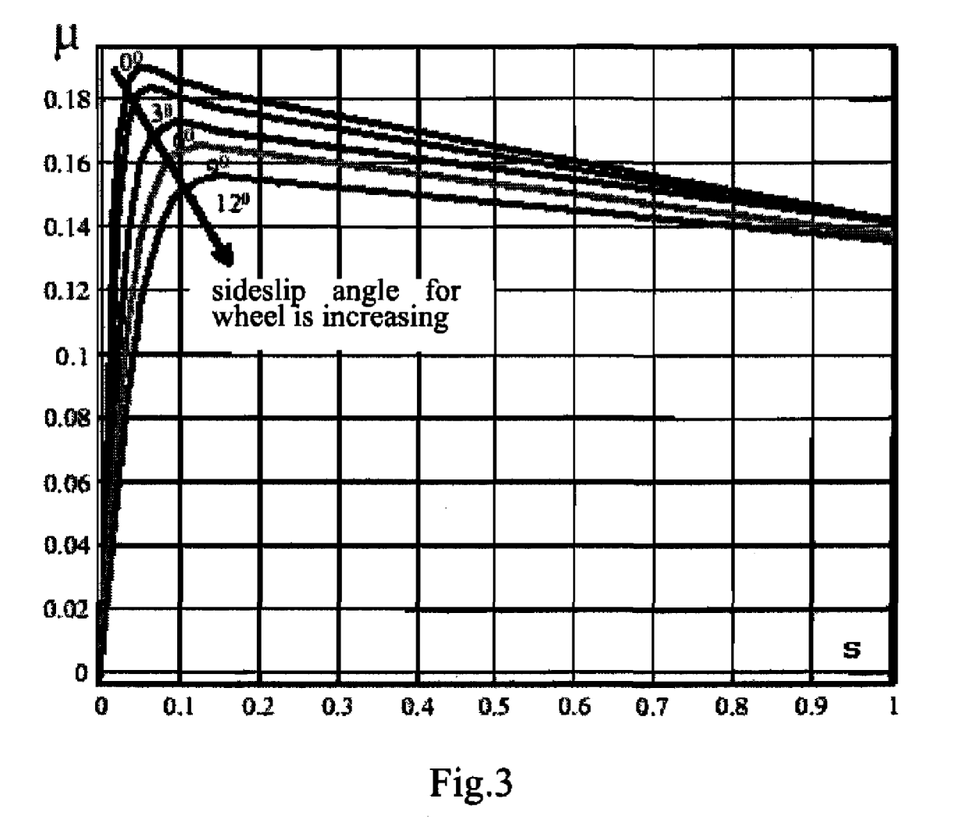
FIG. 3 is a curve chart of braking force coefficient at different sideslip angles.

As shown in FIG. 2, in step S810, the electronic control unit 30 sets the lower limit $s_i^{min}$ and the upper limit $s_i^{max}$ of slip rate threshold for ABS control for the $i^{th}$ wheel in accordance with the sideslip angle $\alpha_i$ of the $i^{th}$ wheel. For different sideslip angles, the curve of braking force coefficient μ vs. slip rate s is also different, and the greater braking force coefficients correspond to different slip rate ranges; therefore, different upper and lower limits of slip rate threshold should be set for the wheel at different sideslip angles. FIG. 3 shows the curve of braking force coefficient vs. sideslip angle. R.PUSCA et al provided the emulation curve chart in "Slip Control Strategy of an Electrical Four Wheel Drive Vehicle". Hereafter an embodiment of the present invention will be provided referred to the curve. ABS control is executed for slip rate ±0.02 corresponding to the peak of braking force coefficient μ; since the range of slip rate s varies with the sideslip angle, different slip rate thresholds should be set at different sideslip angles; a look-up table method (i.e., the table of slip rate thresholds vs. sideslip angles as shown in Table 1, which is prepared on the basis of FIG. 3) can be used to obtain the slip rate thresholds; at other sideslip angles, the corresponding slip rate thresholds can be determined with an interpolation method.

In step S820, determining whether the slip rate $s_i$ for the $i^{th}$ wheel is within the range of slip rate threshold; if $s_i^{min} < s_i < s_i^{max}$, proceed to step S840; otherwise proceed to step S830.

TABLE 1

| sideslip angle (°) | lower limit of slip rate | upper limit of slip rate |
| --- | --- | --- |
| 0 | 0.03 | 0.07 |
| 3 | 0.05 | 0.09 |
| 6 | 0.07 | 0.11 |
| 9 | 0.11 | 0.15 |
| 12 | 0.13 | 0.17 |

In step S830, determining whether the slip rate $s_i$ for the $i^{th}$ wheel is greater than $s_i^{max}$ again; if $s_i > s_i^{max}$, proceed to step S850; otherwise proceed to step S860.

In step S840, the electronic control unit 30 outputs a command to keep the braking force applied on the $i^{th}$ wheel unchanged.

In step S850, the electronic control unit 30 outputs a command to decrease the braking force applied on the $i^{th}$ wheel.

In step S860, the electronic control unit 30 outputs a command to increase the braking force applied on the $i^{th}$ wheel.

In the system described in the present invention, the method used by the data processing unit to calculate the sideslip angle and slip rate for each wheel of a four-wheel vehicle can be an existing method; a preferred method is to obtain the centroidal speed of the vehicle, in that way, the four wheels of the vehicle will center around the centroid; that method can simplify the calculation. In order to obtain the centroidal speed, the preferred method in the present invention is to mount GPS 21 of said signal collection unit on the top of the vehicle, right above the centroid of the vehicle, so as to obtain the centroidal speed of the vehicle.

Figure 4:
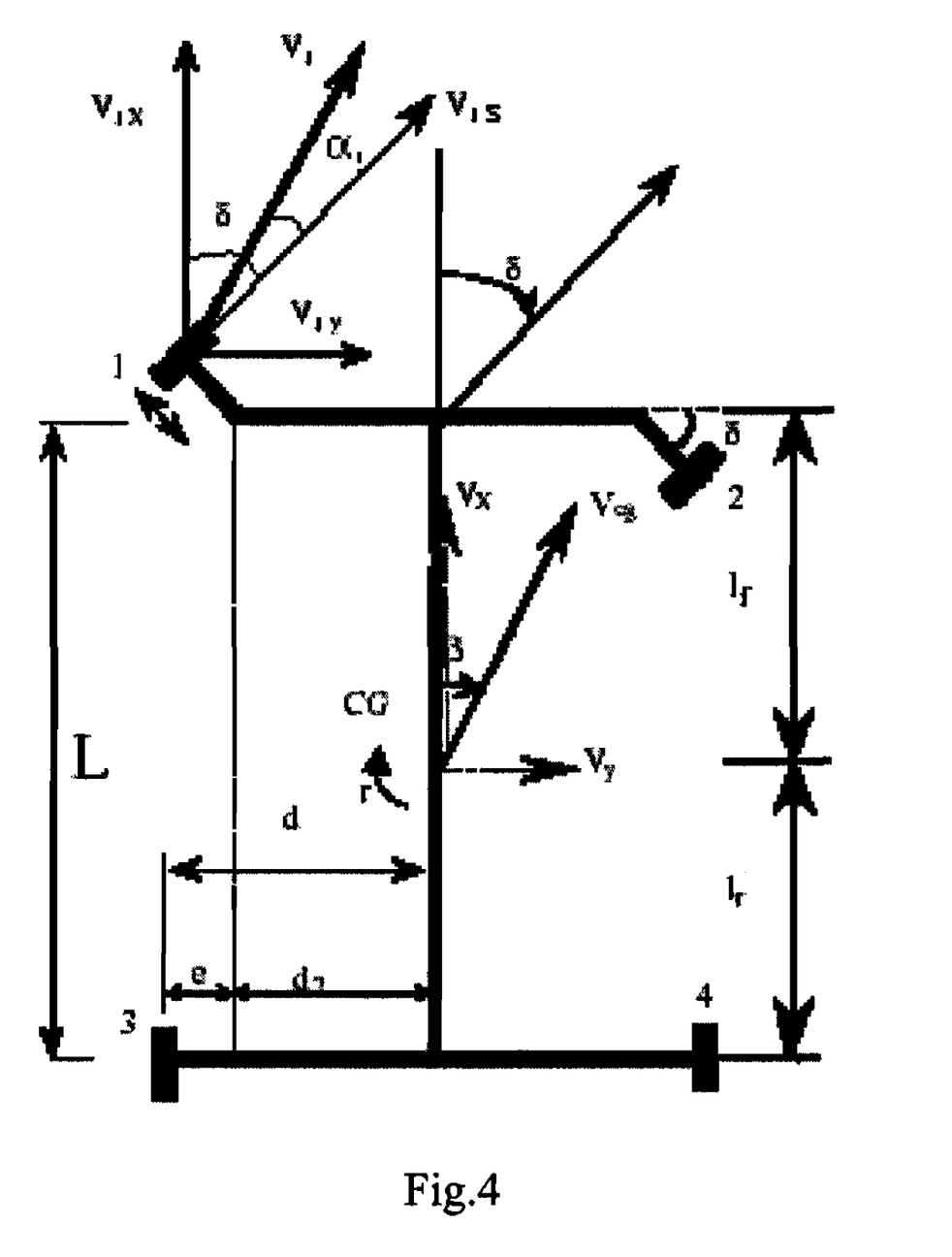
FIG. 4 is a schematic diagram of vehicle model when the vehicle turns.
Figure 5:
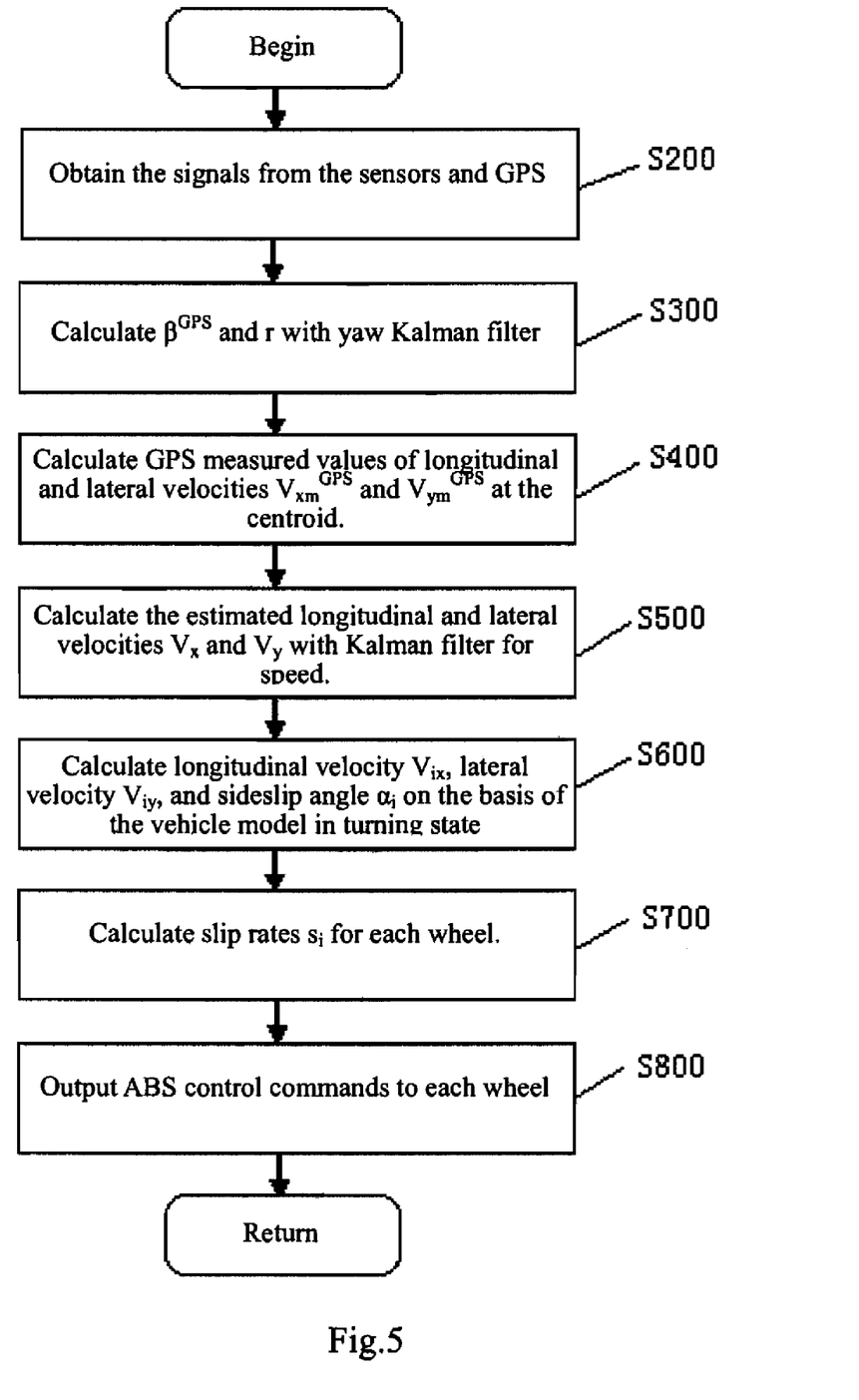
FIG. 5 is an operating flow diagram of the electronic control unit.

The operating principle of the embodiment of the present invention is as follows: the vehicle model in turning state is shown in FIG. 4. The electronic control unit 30 is the core of the entire system. FIG. 5 shows the operating flow diagram of the electronic control unit 30. With the system described in the present invention mounted on the vehicle, when the vehicle runs, the centroidal speed signal of the vehicle can be obtained from GPS 21, and the angular speed signal can be obtained from the gyro. The data receiving module in said electronic control unit 30 executes step S200 to obtain the centroidal speed and angular speed signals of the vehicle. The data processing module in said electronic control unit 30 executes steps S300-S700: firstly, by using the obtained signals, a yaw Kalman filter is utilized to execute step S300 to calculate the GPS measured value $\beta^{GPS}$ of sideslip angle and estimated yaw rate r at the centroid of the vehicle, wherein $\beta$ is the sideslip angle at centroid, and r is the yaw rate of vehicle, while the Kalman filter is a filter implemented with a well-known mathematical algorithm.

Preferably, according to the present invention, said data processing module comprises: a submodule for calculating the sideslip angle and the estimated yaw rate at the centroid; a submodule for calculating the GPS measured value of longitudinal and lateral velocities at the centroid; a submodule for calculating the estimated longitudinal and lateral velocities at the centroid; a submodule for calculating the longitudinal and lateral velocities for each wheel; a submodule for calculating the sideslip angle for each wheel; and a submodule for calculating the slip rate for each wheel. Hereafter, the specific calculation method and process will be introduced.

The data processing module in said electronic control unit 30 executes step S400 to calculate the GPS measured values of longitudinal and lateral velocities $V_x^{GPS}$ and $V_y^{GPS}$ at the centroid of the vehicle according to the equations (1) and (2).

$$V_x^{GPS} = V_{cg}^{GPS} \cos(\beta^{GPS}) \tag{1}$$

$$V_y^{GPS} = V_{cg}^{GPS} \sin(\beta^{GPS}) \tag{2}$$

Where, $V_{cg}^{GPS}$ is the GPS measured value of centroidal speed of the vehicle that is obtained directly by GPS 21.

The data receiving module in said electronic control unit 30 obtains the accelerometer signal from the acceleration sensor 24. With the measured GPS values of longitudinal and lateral velocities $V_x^{GPS}$ and $V_y^{GPS}$ at the centroid of the vehicle and the acceleration signal, said data processing module utilizes a Kalman filter for speed to execute step S500 to calculate the estimated longitudinal and lateral velocities $V_x$ and $V_y$ at the centroid.

The data receiving module of said electronic control unit 30 obtains the steering wheel angle value from the steering wheel angle sensor 25. With the calculated $V_x$ and $V_y$ and the obtained steering wheel angle signal, on the basis of the vehicle model in turning state as shown in FIG. 4, the data processing module in said electronic control unit 30 executes step S600 to calculate the longitudinal velocity $V_{ix}$, lateral velocity $V_{iy}$, and sideslip angle $\alpha_i$ at the center of each wheel according to the equations (3)-(10), wherein, $V_{ix}$ (i=1, 2, 3, or 4) is the longitudinal component of wheel speed (i.e., longitudinal velocity) at the center of the i$^{th}$ wheel, $V_{iy}$ (i=1, 2, 3, or 4) is the lateral component of wheel speed (i.e., lateral velocity) at the center of the i$^{th}$ wheel, and $\alpha_i$ (i=1, 2, 3, or 4) is the sideslip angle of the i$^{th}$ wheel (note: only $V_{1x}$, $V_{1y}$ and $\alpha_1$ for the first wheel are shown in the drawing). The equations are:

$$V_{1x} = V_x + r(d_2 + e \cos(\delta)) \tag{3}$$

$$V_{1y} = V_y + r(l_f + e \sin(\delta)) \tag{4}$$

$$V_{2x} = V_x - r(d_2 - e \cos(\delta)) \tag{5}$$

$$V_{2y} = V_y + r(l_f - e \sin(\delta)) \tag{6}$$

$$V_{3x} = V_x + r(d_2 + e) \tag{7}$$

$$V_{3y} = V_y + rl_r \tag{8}$$

$$V_{4x} = V_x - r(d_2 + e) \tag{9}$$

$$V_{4y} = V_y - rl_r \tag{10}$$

Where, e is the distance from the steering knuckle spindle to the tire tread centre; $d_2$ is the lateral distance from the centroid to the steering knuckle; and $l_f$ and $l_r$ are the distance from the centroid to the front axle and the distance from centroid to rear axle, respectively.

As shown in FIG. 4, the sideslip angle $\alpha_1$ is the included angle between center speed $V_1$ for the first wheel and wheel plane.

$$\alpha_1 = \delta - \arctan \frac{V_{1y}}{V_{1x}} \tag{11}$$

Similarly, the sideslip angles for other wheels can be obtained:

$$\alpha_2 = \delta - \arctan \frac{V_{2y}}{V_{2x}} \tag{12}$$

$$\alpha_3 = \arctan \frac{V_{3y}}{V_{3x}} \tag{13}$$

$$\alpha_4 = \arctan \frac{V_{4y}}{V_{4x}} \tag{14}$$

Where, $\delta$ is the steering angle of wheel (converted from the turning angle of steering wheel, which is obtained from the steering wheel angle sensor 25).

Hereafter the slip rate $s_i$ for each wheel will be calculated with the signal from the wheel speed sensor 24 and above calculated result.

With said longitudinal velocity $V_{ix}$, lateral velocity $v_{iy}$, wheel rolling radius $r_w$, and wheel rotation speed $\omega_i$ of the i$^{th}$ wheel, said electronic control unit executes step S700 to calculate the slip rate $s_i$ (i=1, 2, 3, or 4) for each wheel according to the equation (15);

$$s_i = \frac{\sqrt{V_{ix}^2 + V_{iy}^2} \cos(\alpha_i) - r_w \omega_i}{\sqrt{V_{ix}^2 + V_{iy}^2} \cos(\alpha_i)} \tag{15}$$

Using above method and combining GPS and sensors, the sideslip angle and slip rate for each wheel of the four-wheel vehicle can be calculated.

The data control module in said electronic control unit 30 executes step S800. The execution method has been described above.

Figure 6:
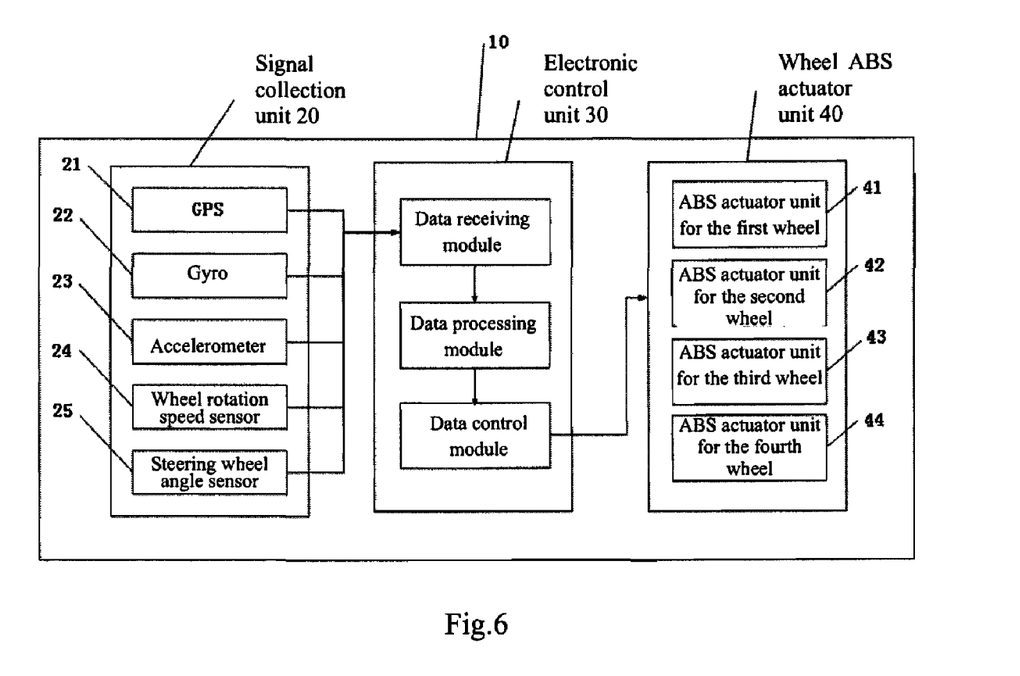
FIG. 6 is a structural block diagram of the vehicle ABS control system in accordance with an embodiment of the present invention.

FIG. 6 is a system structural diagram in accordance with an embodiment of the present invention. The system is added with an ABS actuator unit. Said ABS actuator unit 40 comprises an ABS actuator for the first wheel 41, an ABS actuator for the second wheel 42, an ABS actuator for the third wheel, and an ABS actuator for the fourth wheel. Said vehicle ABS control system is based on a four-wheel vehicle model; the ABS actuators for four wheels in said wheel ABS actuator unit are independent to each other.

Said electronic control unit is electrically connected to the GPS, the gyro, the accelerometer, the wheel speed sensors, and the steering wheel angle sensor in said signal collection unit, as well as the ABS actuator for the first wheel, the ABS actuator for the second wheel, the ABS actuator for the third wheel, and the ABS actuator for the fourth wheel in said wheel ABS actuator unit.

With the vehicle ABS control method utilized in said vehicle ABS control system provided in present invention, after said system in the embodiment is mounted on the vehicle and the above calculation and control method is loaded in the electronic control unit, the onboard GPS and other sensors measure the sideslip angle and slip rate for each wheel, the system sets the upper limit and lower limit $s^{min}$ and $s^{max}$ of slip rate for each wheel at different sideslip angles, and outputs control commands to the wheel ABS actuator unit in accordance with the relationship between the measured slip rates and the set slip rate thresholds to accomplish ABS control for each wheel.

While the present invention has been illustrated and described with reference to some preferred embodiments, the present invention is not limited to these. Those skilled in the art should recognize that various variations and modifications can be made without departing from the spirit and scope of the present invention as defined by the accompanying claims.

The invention claimed is:

1. An vehicle anti-skid brake control system, comprising a signal collection unit and an electronic control unit; said electronic control unit comprises a data receiving module, a data processing module, and a data control module; said data receiving module is configured to obtain the data from the signal collection unit, wherein said data processing module is configured to calculate the sideslip angles and slip rates for wheels, said data control module sets a slip rate threshold in accordance with the slip rate corresponding to the respective peak of braking force coefficient $\mu$ at different sideslip angles, and outputs a control command in accordance with the result of comparison between the calculated slip rate and the set slip rate threshold to perform anti-skid brake control in real time.

2. The vehicle anti-skid brake control system of claim 1, wherein, said vehicle is a four-wheel vehicle, said data receiving module is configured to receive the data of the four-wheel vehicle collected by said signal collection unit, said data processing module is configured to calculate the sideslip angle $\alpha_i$ and slip rate $s_i$ for each wheel of the four-wheel vehicle, said data control module sets the lower limit $s^{min}$ and upper limit $s^{max}$ of respective slip rate threshold in accordance with the slip rates $s_i$ corresponding to respective peak of braking force coefficients $\mu$ at different sideslip angles, and outputs a control command based on the result of comparison between the calculated slip rate $s_i$ and the set limits of slip rate threshold $s^{min}$ and $s^{max}$ to perform anti-skid brake control in real time; wherein, $\alpha_i$ is the sideslip angle of the $i^{th}$ wheel, $s_i$ is the slip rate of the $i^{th}$ wheel, and i=1, 2, 3, or 4.

3. The vehicle anti-skid brake control system of claim 2, wherein, said signal collection unit comprises a GPS configured to obtain an instantaneous centroidal speed $V_{eg}^{GPS}$ of the vehicle, a gyro configured to obtain an instantaneous angular speed of the vehicle, an accelerometer configured to obtain an instantaneous acceleration of the vehicle, wheel speed sensors configured to obtain instantaneous wheel rotation speeds $\omega_i$ of the vehicle, and a steering wheel angle sensor configured to obtain an instantaneous steering wheel angle of the vehicle; said GPS is mounted on the top of the vehicle, right above the centroid of the vehicle; said data processing module comprises a submodule for calculating the sideslip angle $\beta^{GPS}$ and the estimated yaw rate r at the centroid from said centroidal speed $V_{eg}^{GPS}$ and angular speed, a submodule for calculating the GPS measured values of longitudinal and lateral velocities $V_x^{GPS}$ and $V_y^{GPS}$ at the centroid respectively from the obtained centroidal speed $V_{eg}^{GPS}$ and sideslip angle $\beta^{GPS}$, a submodule for calculating the estimated longitudinal and lateral velocities $V_x$ and $V_y$ at the centroid from the obtained GPS measured values of longitudinal and lateral velocities $V_x^{GPS}$ and $V_y^{GPS}$, a submodule for calculating the longitudinal and lateral velocities $V_{ix}$ and $V_{iy}$ for each wheel, a submodule for calculating the sideslip angle $\alpha_i$ for each wheel, and a submodule for calculating the slip rate $s_i$ for each wheel.

4. The vehicle anti-skid brake control system of claim 3, wherein, the submodule for calculating the sideslip angle $\beta^{GPS}$ and the estimated yaw rate r at the centroid is a yaw Kalman filter;

the submodule for calculating the GPS measured values of longitudinal and lateral velocities $V_x^{GPS}$ and $V_y^{GPS}$ calculates according to the equations (1) and (2):

$$V_x^{GPS} = V_{eg}^{GPS} \cos(\beta^{GPS}) \quad (1)$$

$$V_y^{GPS} = V_{eg}^{GPS} \sin(\beta^{GPS}) \quad (2);$$

the submodule for calculating the estimated longitudinal and lateral velocities $V_x$ and $V_y$ at the centroid is a Kalman filter for speed;

the submodule for calculating the longitudinal and lateral velocities $V_{ix}$ and $V_{iy}$ for each wheel calculates according to the equations (3)-(10):

$$V_{1x} = V_x + r(d_2 + e \cos(\delta)) \quad (3)$$

$$V_{1y} = V_y + r(l_f + e \sin(\delta)) \quad (4)$$

$$V_{2x} = V_x - r(d_2 - e \cos(\delta)) \quad (5)$$

$$V_{2y} = V_y + r(l_f - e \sin(\delta)) \quad (6)$$

$$V_{3x} = V_x + r(d_2 + e) \quad (7)$$

$$V_{3y} = V_y + rl_r \quad (8)$$

$$V_{4x} = V_x - r(d_2 + e) \quad (9)$$

$$V_{4y} = V_y - rl_r \quad (10)$$

where, $\delta$ is the steering angle of wheel, e is the distance from the steering knuckle spindle to the tire tread centre; $d_2$ is the lateral distance from the centroid to the steering knuckle; and $l_f$ and $l_r$ are the distance from the centroid to the front axle and the distance from the centroid to the rear axle, respectively;

the submodule for calculating the sideslip angle $\alpha_i$ for each wheel calculates according to the equations (11)-(14):

$$\alpha_1 = \delta - \arctan\frac{V_{1y}}{V_{1x}} \quad (11)$$

$$\alpha_2 = \delta - \arctan\frac{V_{2y}}{V_{2x}} \quad (12)$$

-continued $$\alpha_3 = \arctan\frac{V_{3y}}{V_{3x}} \quad (13)$$

$$\alpha_4 = \arctan\frac{V_{4y}}{V_{4x}} \quad (14)$$

the submodule for calculating the slip rate $s_i$ for each wheel calculates according to the equations (15):

$$s_i = \frac{\sqrt{V_{ix}^2 + V_{iy}^2}\cos(\alpha_i) - r_w\omega_i}{\sqrt{V_{ix}^2 + V_{iy}^2}\cos(\alpha_i)}. \quad (15)$$

5. The vehicle anti-skid brake control system of claim 2, wherein, said data control module utilizes a look-up table method and/or an interpolation method to set the lower limit $s^{min}$ and upper limit $s^{max}$ of respective slip rate threshold at different sideslip angles.

6. The vehicle anti-skid brake control system of claim 2, wherein, if the slip rate $s_i$ meets $s^{min} \leq s_i \leq s^{max}$, said data control module will output a command that keeps the wheel braking force unchanged; if the slip rate $s_i$ is greater than $s^{max}$, said data control module will output a command that decreases the wheel braking force; and if the slip rate $s_i$ is smaller than $s^{min}$, said data control module will output a command that increases the wheel braking force.

7. The vehicle anti-skid brake control system of claim 2, wherein, said system further comprises an ABS actuator unit, which comprises an ABS actuator for the first wheel, an ABS actuator for the second wheel, an ABS actuator for the third wheel, and an ABS actuator for the fourth wheel; the four ABS actuators are independent to each other and receive the control commands from said data processing module.

8. The vehicle anti-skid brake control system of claim 3, wherein, said system further comprises an ABS actuator unit, which comprises an ABS actuator for the first wheel, an ABS actuator for the second wheel, an ABS actuator for the third wheel, and an ABS actuator for the fourth wheel; the four ABS actuators are independent to each other and receive the control commands from said data processing module.

9. The vehicle anti-skid brake control system of claim 4, wherein, said system further comprises an ABS actuator unit, which comprises an ABS actuator for the first wheel, an ABS actuator for the second wheel, an ABS actuator for the third wheel, and an ABS actuator for the fourth wheel; the four ABS actuators are independent to each other and receive the control commands from said data processing module.

10. The vehicle anti-skid brake control system of claim 5, wherein, said system further comprises an ABS actuator unit, which comprises an ABS actuator for the first wheel, an ABS actuator for the second wheel, an ABS actuator for the third wheel, and an ABS actuator for the fourth wheel; the four ABS actuators are independent to each other and receive the control commands from said data processing module.

11. The vehicle anti-skid brake control system of claim 6, wherein, said system further comprises an ABS actuator unit, which comprises an ABS actuator for the first wheel, an ABS actuator for the second wheel, an ABS actuator for the third wheel, and an ABS actuator for the fourth wheel; the four ABS actuators are independent to each other and receive the control commands from said data processing module.

12. An vehicle anti-skid brake control method, comprising:
step 1: a data collection unit collecting vehicle data;
step 2: an electronic control unit receiving the vehicle data collected by the data collection unit, and calculating sideslip angles and slip rates for the vehicle wheels from said data;
step 3: the electronic control unit setting the slip rate threshold for respective sideslip angle in accordance with the slip rate corresponding to the respective peak of braking force coefficient μ at different sideslip angles; and
step 4: the electronic control unit comparing the calculated slip rate with the set slip rate threshold, and outputting an ABS control command in accordance with the result of comparison.

13. The vehicle anti-skid brake control method of claim 12, wherein, said vehicle is a four-wheel vehicle, and said data collection unit collects the data for the four-wheel vehicle through the following steps:
step 1': the data collection unit collecting the data for each wheel of the four-wheel vehicle;
step 2': the electronic control unit receiving the data for each wheel of the four-wheel vehicle collected by the data collection unit and calculating sideslip angle $\alpha_i$ and slip rate $s_i$ for each wheel of the four-wheel vehicle from said data;
step 3': the electronic control unit setting the lower limit $s^{min}$ and the upper limit $s^{max}$ of respective slip rate thresholds at different sideslip angles in accordance with the different slip rates corresponding to the respective peak of braking force coefficients μ at the different sideslip angles; and
step 4': the electronic control unit comparing the calculated slip rate $s_i$ with the slip rate limits $s^{min}$ and $s^{max}$, and outputting a control command;
where, $\alpha_i$ is the sideslip angle of the $i^{th}$ wheel, $s_i$ is the slip rate of the $i^{th}$ wheel, and i=1, 2, 3, or 4.

14. The vehicle anti-skid brake control method of claim 13, wherein said signal collection unit comprises a GPS, a gyro, an accelerometer, wheel speed sensors, and a steering wheel angle sensor; said GPS is mounted on the top of the vehicle, right above the centroid of the vehicle; said step 1' that is used to collect the data for each wheel of the four-wheel vehicle comprises: the GPS measuring an instantaneous centroidal speed $V_{eg}^{GPS}$ of the running vehicle, the gyro measuring an instantaneous angular speed of the running vehicle, the accelerometer measuring an instantaneous acceleration of the running vehicle, the wheel speed sensors measuring instantaneous wheel rotation speeds $\omega_i$ of the running vehicle, and the steering wheel angle sensor measuring an instantaneous steering wheel angle of the running vehicle; and said step 2' that is used to calculate the sideslip angle $\alpha_i$ and slip rate $s_i$ for each wheel of the four-wheel vehicle comprises:
calculating the sideslip angle $\beta^{GPS}$ and estimated yaw rate r at the centroid from said centroidal speed $V_{eg}^{GPS}$ and angular speed;
calculating the GPS measured values of longitudinal and lateral speeds $V_x^{GPS}$ and $V_y^{GPS}$ at the centroid from said centroidal speed $V_{eg}^{GPS}$ and sideslip angle $\beta^{GPS}$;
calculating the estimated longitudinal and lateral velocities $V_x$ and $V_y$ at the centroid from the measured GPS values of longitudinal and lateral velocities $V_x^{GPS}$ and $V_y^{GPS}$;
calculating the estimated longitudinal and lateral velocities for each wheel Vx;
and calculating the sideslip angle $\alpha_i$ and slip rate $s_i$ for each wheel.

15. The vehicle anti-skid brake control method of claim 14, wherein said step 1' that is used to calculate the sideslip angle $\alpha_i$ and slip rate $s_i$ for each wheel comprises:

A. said electronic control unit calculating the estimated sideslip angle $\beta^{GPS}$ and yaw rate r at the centroid with a yaw Kalman filter from said $V_{eg}^{GPS}$ and angular speed;
B. said electronic control unit calculating the GPS measured values of longitudinal and lateral velocities $V_x^{GPS}$ and $V_y^{GPS}$ at the centroid of the vehicle according to the equations (1) and (2):

$$V_x^{GPS} = V_{eg}^{GPS} \cos(\beta^{GPS}) \quad (1)$$

$$V_y^{GPS} = V_{eg}^{GPS} \sin(\beta^{GPS}) \quad (2)$$

C. said electronic control unit calculating the estimated longitudinal and lateral velocities $V_x$ and $V_y$ with a Kalman filter for speed from said $V_x^{GPS}$, $V_y^{GPS}$, and the acceleration;
D. said electronic control unit calculating the longitudinal velocity $V_{ix}$ and lateral velocity $V_{iy}$ at the center of each wheel from said $V_x$, $V_y$, and the steering wheel angle according to the following equations (3)-(10), wherein, i=1, 2, 3, or 4;

$$V_{1x} = V_x + r(d_2 + e\cos(\delta)) \quad (3)$$

$$V_{1y} = V_y + r(l_f + e\sin(\delta)) \quad (4)$$

$$V_{2x} = V_x - r(d_2 - e\cos(\delta)) \quad (5)$$

$$V_{2y} = V_y + r(l_f - e\sin(\delta)) \quad (6)$$

$$V_{3x} = V_x + r(d_2 + e) \quad (7)$$

$$V_{3y} = V_y + rl_r \quad (8)$$

$$V_{4x} = V_x - r(d_2 + e) \quad (9)$$

$$V_{4y} = V_y + rl_r \quad (10)$$

wherein, $\delta$ is the steering angle of wheel, e is the distance from the steering knuckle spindle to the tire tread centre; $d_2$ is the lateral distance from the centroid to the steering knuckle; and $l_f$ and $l_r$ are the distance from the centroid to the front axle and the distance from centroid to rear axle, respectively;
E. said electronic control unit calculating the sideslip angle $\alpha_i$ for each wheel according to the following equations (11)-(14):

$$\alpha_1 = \delta - \arctan\frac{V_{1y}}{V_{1x}} \quad (11)$$

$$\alpha_2 = \delta - \arctan\frac{V_{2y}}{V_{2x}} \quad (12)$$

$$\alpha_3 = \arctan\frac{V_{3y}}{V_{3x}} \quad (13)$$

$$\alpha_4 = \arctan\frac{V_{4y}}{V_{4x}} \quad (14)$$

F. said electronic control unit calculating the slip rate $s_i$ for each wheel from said longitudinal velocity $V_{ix}$, lateral velocity $V_{iy}$, wheel rolling radius $r_w$, and wheel rotation speed $\omega_i$ of the $i^{th}$ wheel according to the equation (15)

$$s_i = \frac{\sqrt{V_{ix}^2 + V_{iy}^2}\cos(\alpha_i) - r_w\omega_i}{\sqrt{V_{ix}^2 + V_{iy}^2}\cos(\alpha_i)}. \quad (15)$$

16. The vehicle anti-lock brake control method of claim 13, wherein, in step 3', utilizing a look-up table method and/or an interpolation method to set the respective lower limit $s^{min}$ and upper limit $s^{max}$ of different slip rate thresholds at different sideslip angles.

17. The vehicle anti-skid brake control method of claim 13, wherein said step 4' comprises: judging whether the slip rate $s_i$ of the wheel is within the slip rate threshold, if the slip rate $s_i$ meets $s^{min} < S_i < s^{max}$, said data control module will output a control command that keeps the wheel braking force unchanged; if the slip rate $S_i$ is larger than $s^{max}$, said data control module will output a control command that decreases the wheel braking force; and if the slip rate $S_i$ is smaller than $s^{min}$, said data control module will output a control command that increases the wheel braking force.

* * * * *